(12) United States Patent
Mukaide

(10) Patent No.: US 8,908,376 B2
(45) Date of Patent: Dec. 9, 2014

(54) DISPLAY PANEL

(75) Inventor: Masayoshi Mukaide, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 344 days.

(21) Appl. No.: 13/509,275

(22) PCT Filed: Nov. 10, 2010

(86) PCT No.: PCT/JP2010/070031
§ 371 (c)(1),
(2), (4) Date: May 10, 2012

(87) PCT Pub. No.: WO2011/059004
PCT Pub. Date: May 19, 2011

(65) Prior Publication Data
US 2012/0229988 A1    Sep. 13, 2012

(30) Foreign Application Priority Data

| Nov. 10, 2009 | (JP) | 2009-256800 |
| Nov. 10, 2009 | (JP) | 2009-256801 |
| Nov. 10, 2009 | (JP) | 2009-256802 |
| Nov. 10, 2009 | (JP) | 2009-256803 |
| Nov. 10, 2009 | (JP) | 2009-256804 |

(51) Int. Cl.
*H05K 7/00*    (2006.01)
*H04N 5/64*    (2006.01)

(52) U.S. Cl.
CPC ............ *H04N 5/64* (2013.01); *G09G 2300/04* (2013.01); *G09G 2330/04* (2013.01)
USPC ............................ 361/728; 361/752; 361/799

(58) Field of Classification Search
USPC ......... 361/799, 816, 818, 728–732, 796, 800; 174/51, 35 R, 373–375
See application file for complete search history.

(56) References Cited

U.S. PATENT DOCUMENTS

| 7,804,681 B2 * | 9/2010 | Wu et al. ................... 361/679.21 |
| 8,218,305 B2 * | 7/2012 | Matsutani ................ 361/679.21 |

(Continued)

FOREIGN PATENT DOCUMENTS

| EP | 1631081 A2 | 3/2006 |
| EP | 1631082 A2 | 3/2006 |

(Continued)

OTHER PUBLICATIONS

International Search Report, issued in International Application No. PCT/JP2010/070031, dated Dec. 14, 2010.

(Continued)

*Primary Examiner* — Hung S Bui
(74) *Attorney, Agent, or Firm* — McDermott Will & Emery LLP

(57) ABSTRACT

Disclosed is an image display device which is provided with an image display panel (1), and a housing (2) which houses the image display panel (1). On the rear wall (22) of the housing (2), a socket (6), wherein the plug (71) of a power supply code (7) for supplying the image display panel (1) with power is to be fitted, is provided. On the rear wall (22) of the housing (2), a housing section (3) for housing the socket (6) is provided, and the housing section (3) is configured by bonding together a recessed section (4) provided in the rear wall (22) of the housing (2), and a cover body (5) that covers the opening (40) of the recessed section (4). On the bonding surfaces (431, 512) between the recessed section (4) and the cover body (5), a pair of grooves (31, 32) are provided, and the pair of grooves (31, 32) face each other in the state wherein the recessed section (4) and the cover body (5) are bonded to each other, and the grooves form a through hole (30) opened to the outside from the inside of the housing section (3). On the bonding surfaces (431, 512), second grooves (33, 34) that traverse the grooves are provided, and first seal members (81, 82) are fitted in the second grooves (33, 34).

2 Claims, 5 Drawing Sheets

(56) References Cited

U.S. PATENT DOCUMENTS

| | | | |
|---|---|---|---|
| 8,587,960 B2 * | 11/2013 | Hwang et al. | 361/818 |
| 2005/0185365 A1 | 8/2005 | Yamaguchi et al. | |

FOREIGN PATENT DOCUMENTS

| | | |
|---|---|---|
| JP | 2000-104860 | 4/2000 |
| JP | 2001-075495 | 3/2001 |
| JP | 2003-153424 | 5/2003 |
| JP | 2004-129331 | 4/2004 |
| JP | 2005-286987 | 10/2005 |
| JP | 2005-304104 | 10/2005 |
| JP | 2007-148263 A | 6/2007 |

OTHER PUBLICATIONS

European Search Report issued in European Patent Application No. 10829963.7 dated Jan. 3, 2013.

* cited by examiner

DISPLAY PANEL

RELATED APPLICATIONS

This application is the U.S. National Phase under 35 U.S.C. §371 of International Application No. PCT/JP2010/070031, filed on Nov. 10, 2010, which in turn claims the benefit of Japanese Application No. 2009-256800, filed on Nov. 10, 2009, Japanese Application No. 2009-256801, filed on Nov. 10, 2009, Japanese Application No. 2009-256802, filed on Nov. 10, 2009, Japanese Application No. 2009-256803, filed on Nov. 10, 2009, Japanese Application No. 2009-256804, filed on Nov. 10, 2009, the disclosures of which Applications are incorporated by reference herein.

TECHNICAL FIELD

Present invention regards to a display device having a display panel.

BACKGROUND

The display device of this kind usually have a cabinet to accommodate a display panel, and in usage, the display device is installed facing its back side of the cabinet to the wall or is attached to the wall of the indoor room (see JP2005-286987A1 for example). In such displays, a socket for plugging a power supply cord is employed in order to supply an electric power to the panels. This socket is arranged in the rear wall of the cabinet, usually, facing the socket toward the back side.

In recent years, it is expected to install such display device having a display panel outdoors, since these display device has small thickness. The small thickness is advantageous for installing the display device in narrow locations.

However, in the conventional display device, the plug inserted into the socket protrudes backwards from the rear side of the cabinet backwards. Thereby, a portion of the electricity cord extends backward from the socket. Thus, when installing such display device facing its back side to the wall, it is necessary to have a big room between the backside of the cabinet and the wall.

Further, in the conventional display devices, most of them are designed assuming that they are installed indoors. Thus, they do not have measures to protect the display panels from water or dust. Thereby, when such display device is installed outdoor, the plug or the socket may be exposed by water or dust, and as a result, a short-out in the circuit or fire may cause from the circuit.

One idea is to utilize a dedicated cord having a sealed structure in order to protect the plug and the socket from the dust and water. However, since such dedicated cord is expensive, it increases the manufacturing cost of the display device.

SUMMARY

The first display device of the present invention comprises a display panel, and the cabinet for accommodating the panel. In the front side wall of the cabinet, a displaying window which makes a screen of the panel viewable is provided. In the back side wall of the cabinet, a socket for inserting a plug of the power cord is provided. In the back side wall, an accommodating unit for accommodating the socket is provided. The accommodating unit is formed by jointing a concaved portion provided in the back side wall and a lid which covers the opening of the concaved portion. In the jointing surface of the concaved portion and the lid, a pair of concaved groove is formed. The pair of the groove faces each other while the concaved portion and the lid are jointed. Thus, these grooves form a through hall for communicating the inside and the outside of the accommodating unit. In each of the jointing surface, a second groove which intersects the above-mentioned groove, and in the second groove, a sealing component is fitted thereto.

The second display device of the present invention comprises a display panel, and the cabinet for accommodating the panel. In the front side wall of the cabinet, a displaying window which makes a screen of the panel viewable is provided. In the back side wall of the cabinet, a socket for inserting a plug of the power cord is provided. In the back side wall, an accommodating unit for accommodating the socket is provided. In the accommodating unit, a penetrating hole for penetrating the power cord from the inside to the outside is formed. Further, a sealing structure for preventing water and/or dust intruding from the penetrating hole is provided in the accommodating unit.

The third display device of the present invention comprises a display panel, and the cabinet for accommodating the panel. In the front side wall of the cabinet, a displaying window which makes a screen of the panel viewable is provided. In the back side wall of the cabinet, a socket for inserting a plug of the power cord is provided. In the back side wall, an accommodating unit for accommodating the socket is provided. The accommodating unit is formed by jointing a concaved portion provided in the back side wall and a lid which covers the opening of the concaved portion. In the jointing surface of the concaved portion and the lid, a pair of concaved groove is formed. The pair of the groove faces each other while the concaved portion and the lid are jointed. Thus, these grooves form a through hall for communicating the inside and the outside of the accommodating unit. In each of the jointing surface, a second groove which intersects the above-mentioned groove, and in the second groove, a sealing component is fitted thereto. Regarding the jointing surface of the concaved portion and the lid, in one of the surface, a third groove for surrounding the inner space of the accommodating unit is provided in a concaved manner overlapping the second groove, and to the third groove a second sealing component is fitted.

The fourth display device of the present invention comprises a display panel, and the cabinet for accommodating the panel. In the front side wall of the cabinet, a displaying window which makes a screen of the panel viewable is provided. In the back side wall of the cabinet, a socket for inserting a plug of the power cord is provided. In the back side wall, an accommodating unit for accommodating the socket is provided, such that a part the accommodating unit protrudes from the back side wall. In the inner side wall of the accommodating unit, a through hall for penetrating the power cord is formed in the outside of the area crossing the back side wall of the cabinet.

The fifth display device of the present invention comprises a display panel, and the cabinet for accommodating the panel. In the front side wall of the cabinet, a displaying window which makes a screen of the panel viewable is provided. In the back side wall of the cabinet, a socket for inserting a plug of the power cord is provided. In the back side wall, an accommodating unit for accommodating the socket is provided. In the upper side wall of the accommodating unit, the socket is attached facing downward.

DETAILED DESCRIPTION

Figure 1:
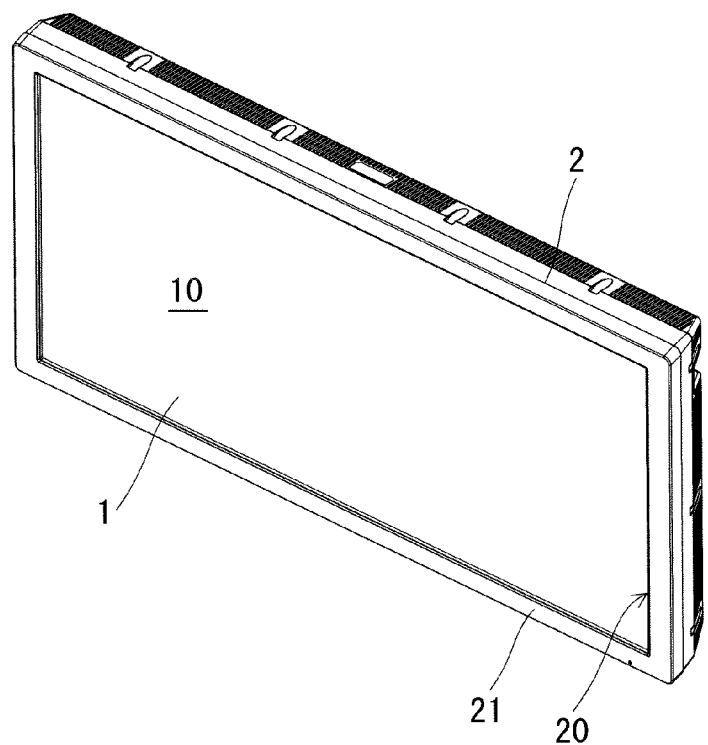
FIG. 1 is a perspective view showing a display device which is an embodiment of the present invention.

The embodiment of the present invention is described below referring to the drawings.

As shown in FIG. 1, the display device which is an embodiment of the present invention has a LCD (Liquid Crystal Display) panel (1), a cabinet (2) for accommodating the panel (1). In the front wall (21) of the cabinet (2), a display window (20) is provided so as to make a screen (10) of the panel (1) viewable from the outside.

Figure 2:
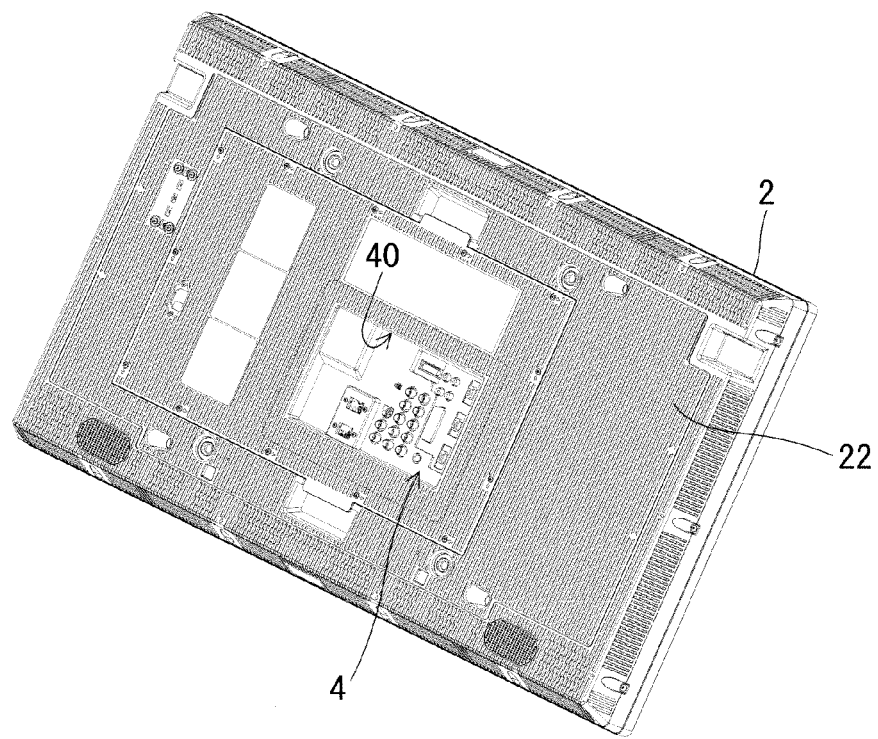
FIG. 2 is a perspective view of the display device when viewed from its back side.
Figure 3:
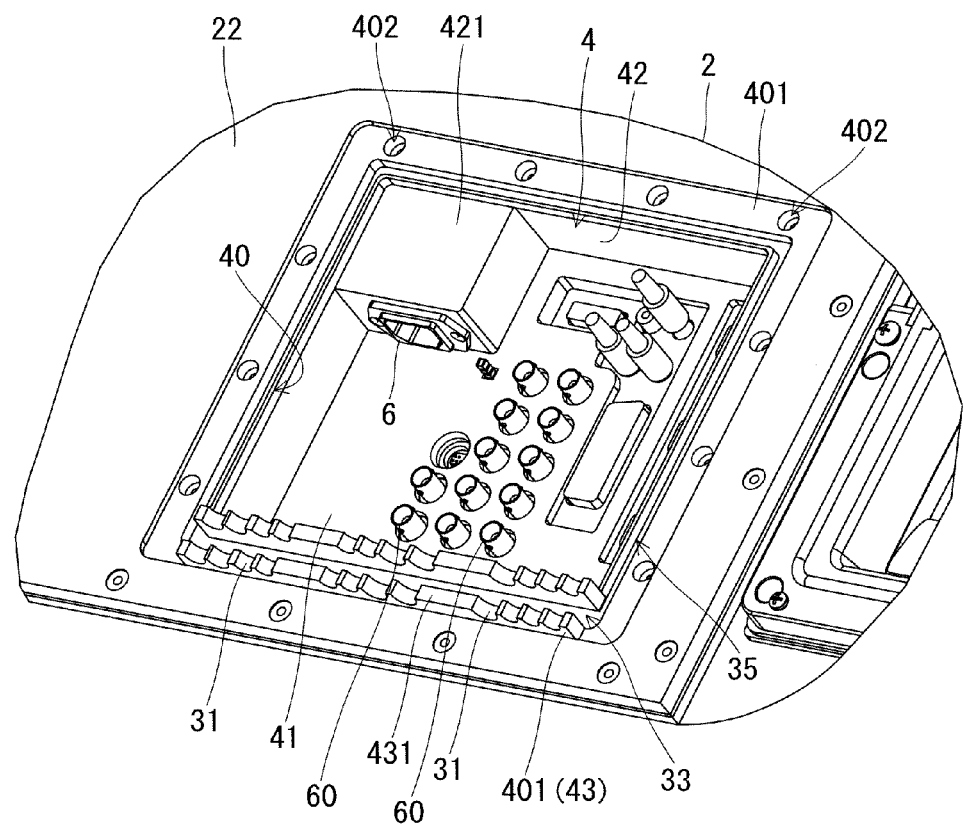
FIG. 3 is an enlarged view of a concaved portion provided on the display device.

As shown in FIG. 2, in the back wall (22) of the cabinet (2), a concaved portion (4) is provided. The portion (4) has an opening (40) having four sides and substantially rectangle. As shown in FIG. 3, a plurality of connectors (60) for connecting cables for receiving or transmitting video or audio signal is attached in the bottom wall (41) of the portion (4) facing backward.

In the upper wall (42) of the portion (4), a socket (6) for inserting the plug (71) (see FIG. 8) of the power cord (7) for supplying power to the LCD panel (1) is attached facing downward. In detail, in the wall (42), a rectangular shaped mounting unit (421) for attaching the socket (6) is formed. The socket (6) is attached downward to the lower wall of the unit (421) so as to penetrate the lower wall.

Figure 4:
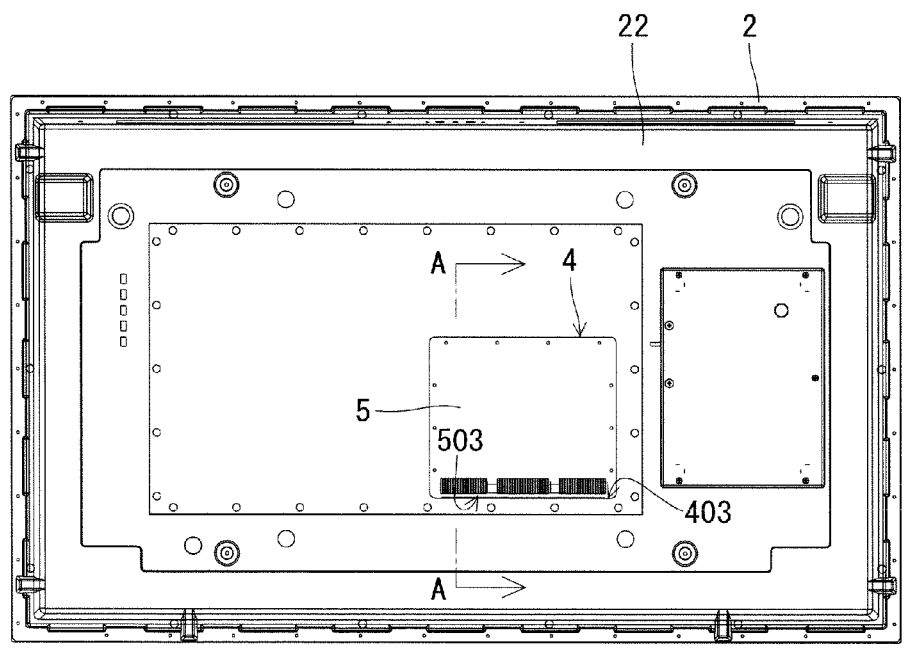
FIG. 4 is a rear view of the display device.
Figure 5:
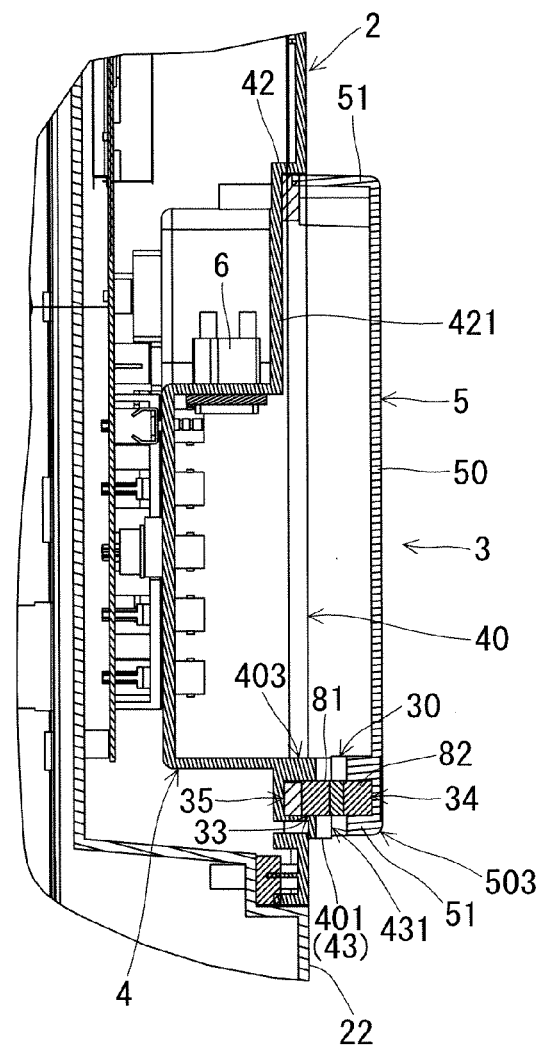
FIG. 5 is a cross sectional view along the A-A line shown in FIG. 4.
Figure 6:
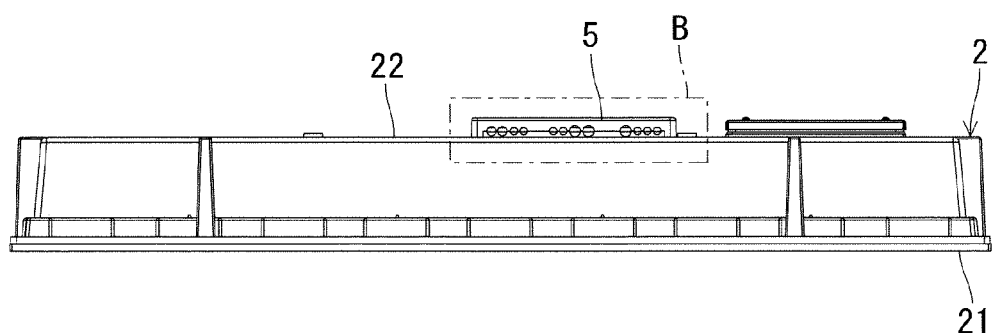
FIG. 6 is an under side view of the display device.

As shown in FIGS. 4 and 5, the opening (40) of the concaved portion (4) is covered by a lid (5) which is jointed to the portion (4). In detail, as shown in the FIG. 3, the portion (4) has an edge portion (401) stretching along the four side of the opening (40) of the portion (4) so that the portion (401) surrounds the opening (40). The lid (5) has a board (50), having four sides and substantially rectangular shaped. In the edge portion of the board (50), four side wall portions (51)-(51) extending along the four side of the board (50) is formed substantially perpendicular to the board (50). By covering the opening (40) of the concaved portion (4) by the lid (5), forefront surface of the wall portions (51) of the panel (5) contacts the edge portion (401). Under this condition, by screwing the lid (5) to the edge portion (401) of the concaved portion (4), the lid (5) is jointed to the portion (4). In addition, plurality of screw holes (402) for screwing is shown in FIG. 3.

Figure 7:
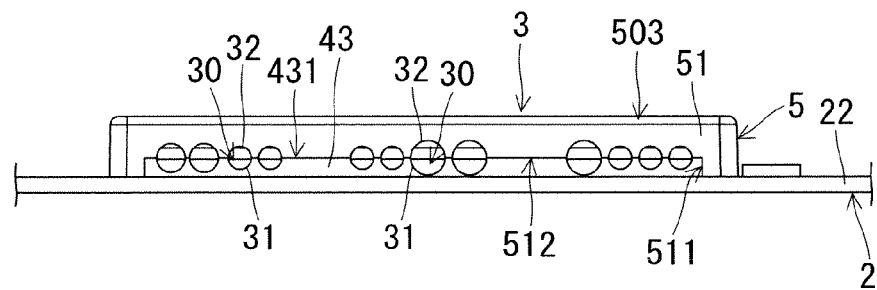
FIG. 7 is an enlarged view of the B area shown in FIG. 6.

Here, as shown in FIGS. 3 and 5, the edge portion (401) of the concaved portion (4) is protruded backward from the back side wall (22) of the cabinet (2) in an area along the side (403), wherein the side (403) is the lower side among four sides forming the portion (4) (see FIG. 4), and thereby a protruding portion (43) is formed. On the other hand, as shown in FIG. 7, among four side wall portions (51), in the portion (51) which extends along the lower side (503) of the top board (50), a fitting concaved portion (511) for fitting the protruded portion (43) is formed so that it conforms to the shape of the portion (43). Thus, when the concaved portion (4) and the lid (5) are jointed, the surface of the forefront portion (431) of the portion (43) contacts the bottom surface (512) of the portion (511).

And thus, as shown in FIG. 5, an accommodating unit (3) for accommodating the connector (60) and the socket (6) is formed by the concaved portion (4) and the lid (5). Among the unit (3), the lid (5) and the protruding portion (43) is protruded backward from the back wall (22) of the cabinet (2).

Figure 8:
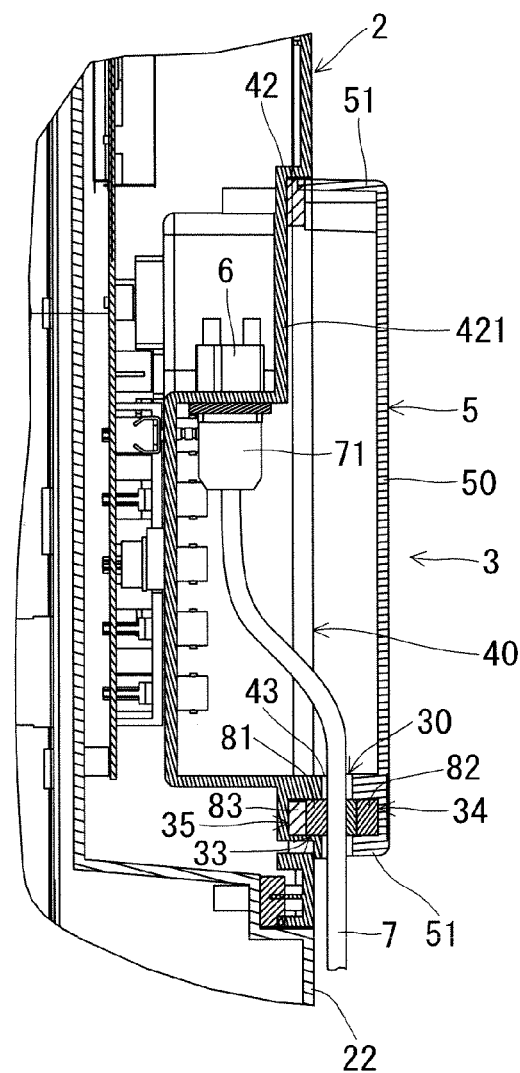
FIG. 8 is a cross sectional view showing a plug of a power cord inserted into a socket provided in the display device.

As shown in FIG. 7, among the jointing surface of the concaved portion (4) and the lid (5), in the jointing surface of the protruding portion (43) and the side wall portion (51) (i.e. in the forefront surface (431) of the portion (43) and the bottom surface (512) of the portion (511)), pairs of the grooves (31) (32) are formed in several places. Each of the pairs of grooves (31) (32) faces each other while the concaved portion (4) and the lid (5) is jointed, and thus a penetrating hole (30) communicating inside and the outside of the accommodating unit (3) is formed. In the hole (30) formed as above, the power cord (7) and the cable are penetrated as shown in FIG. 8.

Thereby, in the above described display device, the penetrating hole (30) for penetrating the power cord (7) and cable is formed outside the area where the back wall (22) of the cabinet (2) and the lower wall of the accommodating unit (3) intersect.

Figure 10:
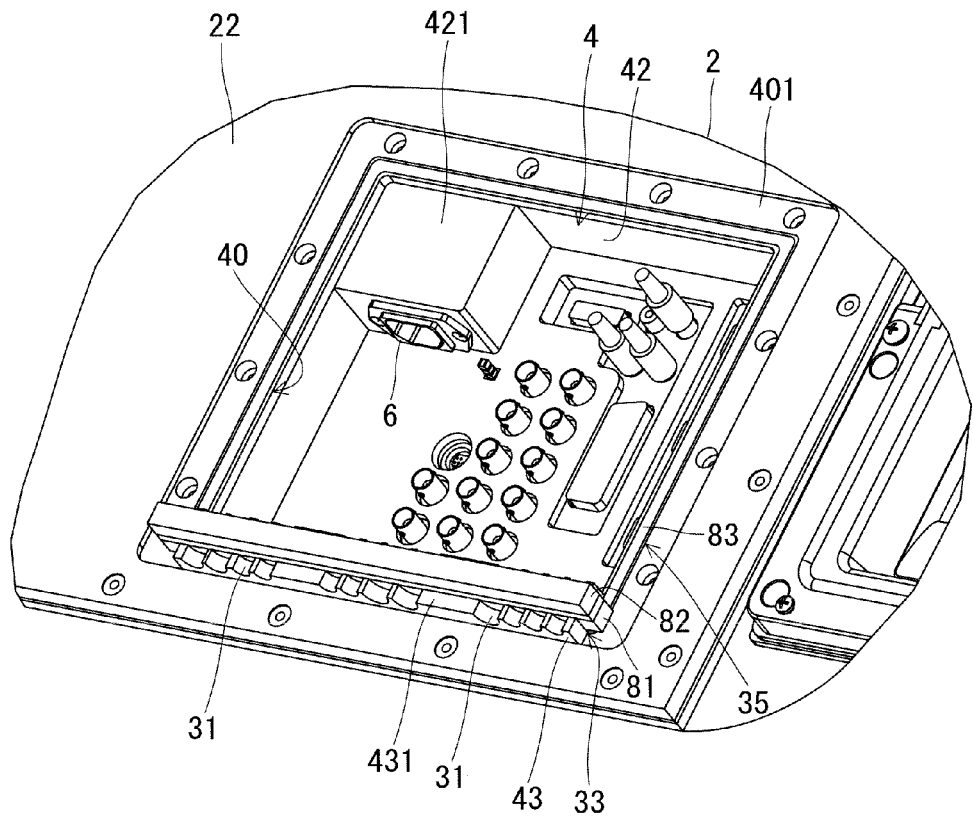
FIG. 10 is a perspective view showing a sealing structure in the accommodating unit provided in the display device.

As shown in FIG. 7, among the jointing surface of the protruding portion (43) and the side wall portion (51), in the protruding portion (43) side surface (i.e. in the forefront surface (431) of the portion (43)), a concaved second groove (33) crossing the plurality of grooves (31) is formed (see FIG. 5 also). As shown in FIGS. 5 and 10, the first sealing component (81) is fitted to the groove (33). Similarly, in the side wall portion (51) side surface (i.e. in the bottom surface (512) of the portion (511)), a concaved second groove (34) crossing the plurality of grooves (32) is formed (see FIG. 5). To the second groove (34), a first sealing component (82) which is different from the first sealing component (81) fitted to the groove (33) in the protruding portion (43) side is fitted as shown in FIG. 5.

The seal components (81) (82) contacts each other when the concaved portion (4) and the lid (5) are jointed. Thus, the penetrating hole (30) formed by jointing the portion (4) and the lid (5) is covered by seal components (81) (82) as shown in FIG. 5, and as a result, intrusion of the water or dust from the hole (30) is prevented by the components (81) (82).

Figure 9:
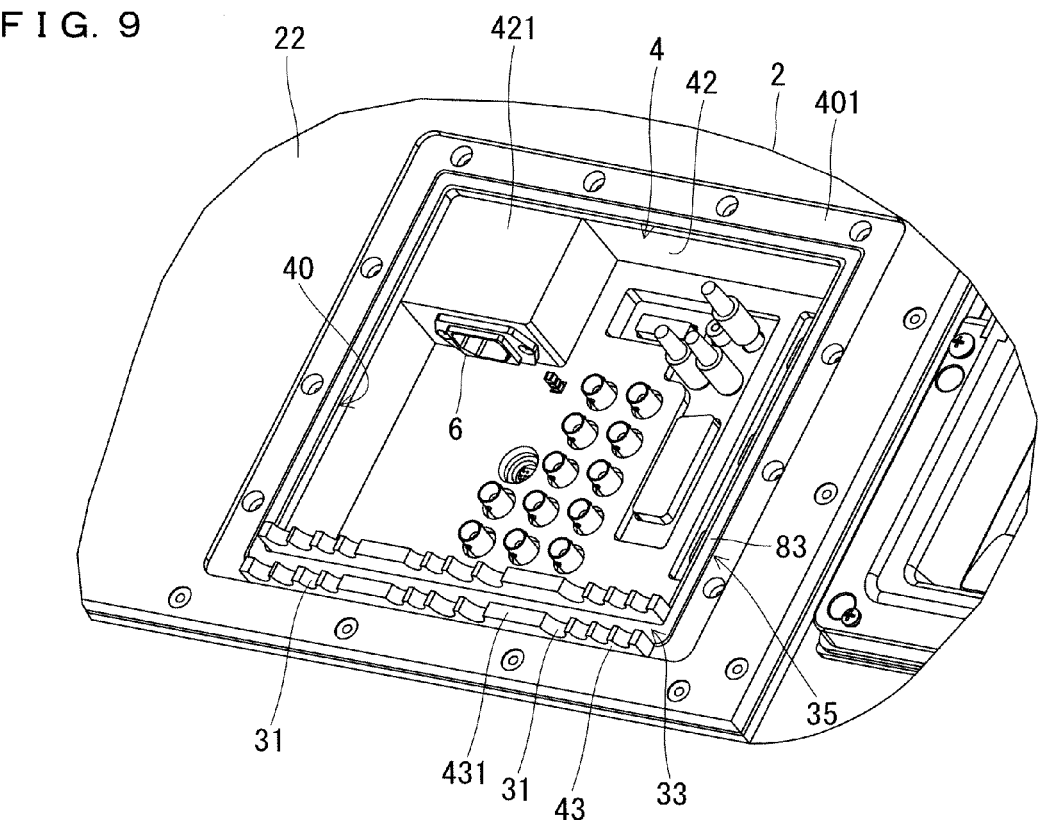
FIG. 9 is a perspective view showing a sealing structure in the accommodating unit provided in the display device.

As shown in FIG. 3, in the concaved portion (4) side of the jointing surface (i.e. the edge portion (401) of the concaved portion (4)), a third groove (35) surrounding the space inside the accommodating unit (3) is formed so as to overlap the second groove (33) in a concaved manner. To this third groove (35), a ring shaped second sealing component (83) is fitted as shown in FIG. 9.

In detail, the third groove (35) is formed along the four side of the opening (40) of the concaved portion (4) which contacts the four side walls (51) of the lid (5) when the lid (5) is jointed to the concaved portion (4). Regarding the third groove (35), width is made smaller for the groove in the upper side, left side, or right side of the opening (40) of the concaved portion (4) compared to the width of the second groove (33). The second sealing component (83) contacts the first sealing component (81) in a portion along the bottom side (403) out of the four side of the opening (40) when the portion (4) and the lid (5) are jointed. At the same time, the sealing component (83) contacts the upper side, left side, or right side of the side wall (51) of the lid (5). Thereby, intrusion of water and dust between the jointing surfaces is prevented by the second sealing component (83).

In the above described display device, by opening the lid (5), the plug (71) of the power cord (7) can be inserted to the socket (6). Here, the socket (6) is provided facing downward. Thus, the plug inserted to the socket (6) protrudes downwards from the socket (6) as shown in FIG. 8, and the power cord (7) extends downward from the socket (6). Thereby, when installing this display device facing its back side to the wall, it requires smaller space (room) in the back side of the display device, compared to the conventional device in which the plug protrudes backwards from the socket.

After inserting the plug (71) to the socket (6), by closing the lid (5) while fitting the power cord (7) to the pair of the groove (31) (32), the cord (7) stretching downward from the socket (6) can be drawn downward from inside the accommodating unit (3) to the outside of the cabinet (2) through the penetrating hole (30) accommodating unit. Similarly, the cable connected to the connector (61) is drawn downward from inside the unit (3) to the outside of the cabinet (2) through the hole (30) unit (3). Thereby, it requires small space in the back side of the display device when installing the device facing its back side to the wall.

Thereby, the display device described above can be installed approaching its back side to the wall, or can be installed to the wall approaching its back side to the wall.

By closing the lid (5) while fitting the power cord (7) and the cable to the pair of the groove (31) (32), the cord (7) and the cable is sandwiched without a gap by first sealing components (81) (82) as shown in FIG. 8. Thus, intrusion of water or dust from the hole (30) is prevented by the sealing components (81) (82) when the cord (7) or the cable is penetrated through the hole (30).

Thus, according to the above described display device, the socket (6), the plug (71), and the connector (61) can be prevented from being exposed to the water or dust even when the display device is installed outdoor. In other words, the accommodating unit (3) formed by the concaved portion (4) and the lid (5) has a sealed structure which prevents water or dust from intruding inside from the hole (30) or from the jointing surface.

Further, in the above described display device, the width of the third groove (35) is made smaller for the portion in the upper side, left side, or right side of the opening (40) of the concaved portion (4) compared to the width of the second groove (33). This can improve the waterproofing or dust-proofing structure of the accommodating unit (3).

The scope of the present invention is not limited to the above described embodiment. It can be modified variously within the scope of the claimed invention. For example, with respect to the above mentioned display device, the third groove (35) may be provided on the lid (5) side of the jointing surface. The penetrating hole (30) may be arranged only in the one place.

In the above described display device, the penetrating hole (30) may be provided on the lower wall of the accommodating unit (3), however, the scope of the present invention is not limited to this. The hole (30) may be provided on the other inner wall of the unit (3), (the upper wall, left side wall, or right side wall). In such case, the hole (30) is formed outside the area intersecting the back wall (22) of the cabinet (2). Thereby, the power cord (7) or the cable can be drawn outside from the accommodating unit (3) not only downward but also upward, leftward or rightward depending on how the display device is installed. Thereby, it can realize the optimum wiring of the cord or the cable depending on the installing place of the display device.

With regards to the above mentioned display device, the sealing structure may be omitted. Even when it is omitted, the socket (6) or the plug (71) inserted to the socket (6) can be accommodated inside the accommodating unit (3). Thus, compared to the conventional display device, it can prevent the socket (6) or the plug (71) inside the unit (3) from being exposed to the water or the dust.

Further, the above described structures may be applied not only to the display device having the LCD panel (1), but also to the display device having a plasma display panel, OLED display panel, or Electro-Luminescence panels etc.

The invention claimed is:

1. A display device comprising:
   a display panel;
   a cabinet configured to accommodate the display panel;
   a socket configured to receive a power cord for supplying power to the display panel;
   a connector configured to receive a cable for transmitting or receiving a signal;
   an accommodating unit provided on a back side of the cabinet and configured to accommodate the socket and the connector;
   a lid configured to cover the accommodating unit; and
   a hole provided on a lower wall of the accommodating unit for receiving a cord portion of the power cord, wherein:
   the socket is provided on an upper wall of the accommodating unit, and
   the connector is provided on a bottom wall of the accommodating unit, the bottom wall being positioned parallel to the display panel,
   the display device being provided at a jointing section between the accommodating unit and the lid with a groove portion for fitting a waterproofing component, and
   the groove portion being provided so as to surround four sides of the accommodating unit, wherein
   at least the width of the groove portion in the lower side of the accommodating unit is larger than the width of the groove portion in a lateral side of the accommodating unit.

2. A display device comprising:
   a display panel;
   a cabinet configured to accommodate the display panel;
   a socket configured to receive a power cord for supplying power to the display panel;
   an accommodating unit provided on a back side of the cabinet and configured to accommodate the socket;
   a lid configured to cover the accommodating unit;
   a hole, provided on a wall of the accommodating unit, for receiving a cord portion of the power cord; and
   a groove portion surrounding the accommodating unit and configured to receive a sealing component, wherein
   the accommodating unit includes an opening and four sides surrounding the opening,
   the socket is provided on an upper wall of the opening and faces a lower wall of the opening,
   the hole is provided on the lower wall of the opening,
   the groove portion is provided along the four sides of the accommodating unit and at a jointing section of the accommodating unit and the lid,
   the width of the groove portion in a bottom side of the accommodating unit is larger than the width of the groove portion in other three sides of the accommodating unit.

* * * * *